(12) United States Patent
Jambur Sathyanarayana et al.

(10) Patent No.: US 11,012,336 B2
(45) Date of Patent: May 18, 2021

(54) TECHNIQUES TO MONITOR CONTROL PLANE NETWORK TRAFFIC

(71) Applicant: Intel Corporation, Santa Clara, CA (US)

(72) Inventors: Krishnamurthy Jambur Sathyanarayana, Limerick (IE); Fiona Trahe, Clarecastle (IE); Anthony Kelly, Limerick (IE); Brendan Ryan, Limerick (IE); Stephen Doyle, Ennis (IE); Andrey Chilikin, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/286,179

(22) Filed: Feb. 26, 2019

(65) Prior Publication Data

US 2019/0199613 A1    Jun. 27, 2019

(51) Int. Cl.
*H04L 12/26* (2006.01)
*H04L 12/46* (2006.01)

(52) U.S. Cl.
CPC ...... *H04L 43/0876* (2013.01); *H04L 12/4641* (2013.01); *H04L 43/16* (2013.01)

(58) Field of Classification Search
CPC .................................................. H04L 43/0876
See application file for complete search history.

(56) References Cited

U.S. PATENT DOCUMENTS

| | | | |
|---|---|---|---|
| 6,643,276 B1 * | 11/2003 | Spets | H04L 12/66 370/328 |
| 9,058,562 B2 * | 6/2015 | Bennett | G06Q 10/04 |
| 2018/0109975 A1 * | 4/2018 | Kalliola | H04W 24/08 |
| 2019/0014550 A1 * | 1/2019 | Rommer | H04W 8/02 |
| 2019/0253930 A1 * | 8/2019 | Senju | G06F 9/45558 |

* cited by examiner

*Primary Examiner* — Kevin M Cunningham
(74) *Attorney, Agent, or Firm* — Compass IP Law PC

(57) ABSTRACT

Examples include techniques to monitor control plane (CP) network traffic. Examples include monitoring CP traffic between one or more user equipment (UEs) wirelessly coupled to a network and a virtual network function arranged to process user plane (UP) traffic for an application service provided to the one or more UEs to determine whether at least a portion of the UP traffic needs to be routed to a different VNF for UP processing.

18 Claims, 9 Drawing Sheets

System 200

Heuristic Information 300
UP Traffic Daily Profile
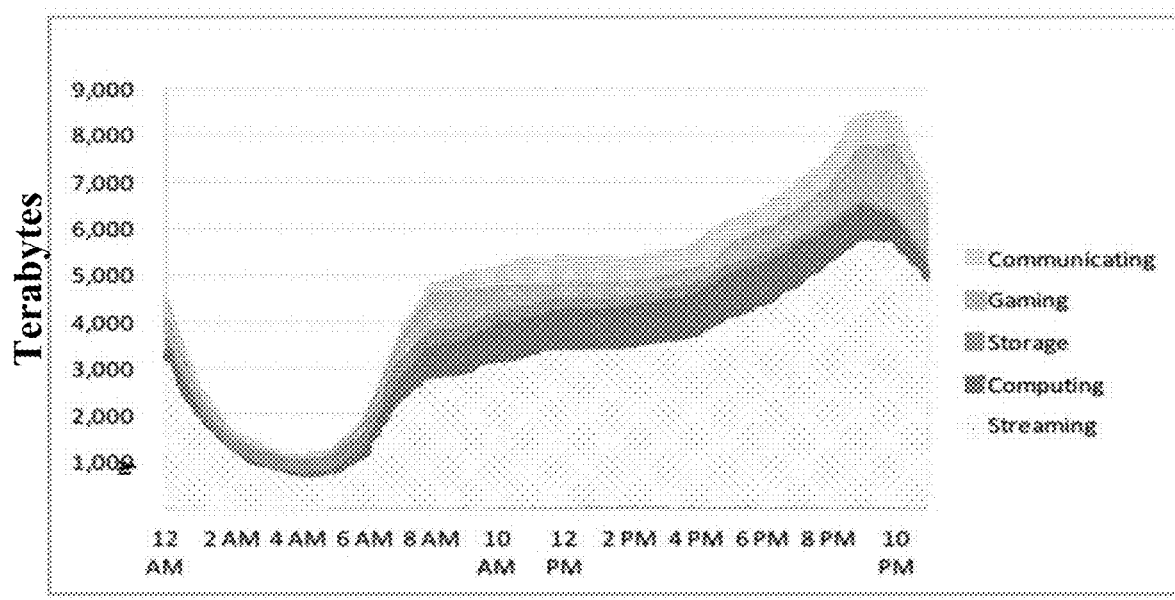
User Plane Data 310
CP Traffic Daily Profile
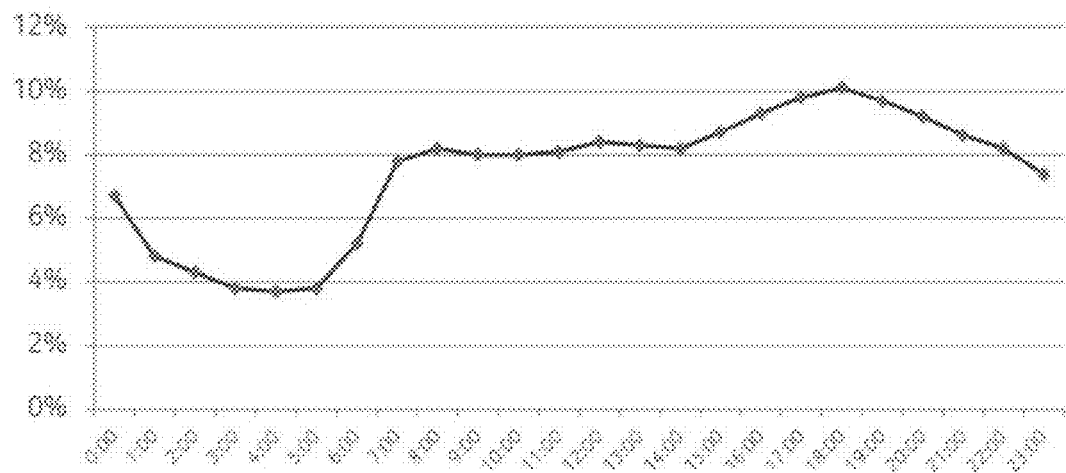
Control Plane Data 320
*FIG. 3*

700

```
┌─────────────────────────────────────────────────────────────────────┐
│ MONITOR CP TRAFFIC BETWEEN ONE OR MORE USER EQUIPMENT (UES)         │
│ WIRELESSLY COUPLED TO A COMMUNICATION NETWORK AND A FIRST VNF       │
│ ARRANGED TO PROCESS THE CP TRAFFIC FOR AN APPLICATION SERVICE       │
│ PROVIDED TO THE ONE OR MORE UES THROUGH A SECOND VNF ARRANGED TO    │
│ PROCESS UP TRAFFIC FOR THE APPLICATION SERVICE, THE UP TRAFFIC AND  │
│ THE CP TRAFFIC ROUTED THROUGH A NIC                                 │
│ 702                                                                 │
└─────────────────────────────────────────────────────────────────────┘
                                    │
┌─────────────────────────────────────────────────────────────────────┐
│ COMPARE, FOLLOWING A MONITORING TIME WINDOW OVER A FIRST TIME       │
│ PERIOD OF A TIME PERIOD, MONITORED CP TRAFFIC TO EXPECTED CP        │
│ TRAFFIC FOR THE APPLICATION SERVICE DURING THE FIRST TIME PERIOD    │
│ 704                                                                 │
└─────────────────────────────────────────────────────────────────────┘
                                    │
┌─────────────────────────────────────────────────────────────────────┐
│ CAUSE AT LEAST A FIRST PORTION OF THE UP TRAFFIC TO BE ROUTED TO A  │
│ THIRD VNF ARRANGED TO PROCESS UP TRAFFIC BASED ON THE COMPARISON    │
│ OF THE MONITORED CP TRAFFIC TO THE EXPECTED CP TRAFFIC              │
│ 706                                                                 │
└─────────────────────────────────────────────────────────────────────┘
```

*FIG. 7*

Storage Medium 800

*Computer Executable Instructions for 700*

*FIG. 8*

TECHNIQUES TO MONITOR CONTROL PLANE NETWORK TRAFFIC

TECHNICAL FIELD

Examples described herein are generally related to monitoring of control plane network traffic associated with networks having edge and core computing resources.

BACKGROUND

Computing resources deployed in communication or data networks for control plane (CP) and user plane (UP) processing or handling are increasingly becoming physically and/or geographically separated. For example, CP and UP separation is becoming a key architecture imperative for current and next generation (e.g., 5G) communication networks. Technical specifications associated with these current and next generation communication networks such as $3^{rd}$ Generation Partnership Project (3GPP) specifications may specify CP and UP separation (also referred to as "CUPS") for software defined networks (SDN)/network function virtualization (NFV) deployments. For some SDN/NFV deployments, CP processing may be primarily at a centralized location of a communication network compared to UP processing that may be distributed throughout the communication network.

BRIEF DESCRIPTION OF THE DRAWINGS

FIG. 3 illustrates example heuristic information.
FIG. 7 illustrates an example of a logic flow.
FIG. 8 illustrates an example of a storage medium.

DETAILED DESCRIPTION

As contemplated by this disclosure, in some SDN/NFV deployments, CP processing may be at a centralized location of a communication network compared to UP or data plane processing that may be distributed throughout the communication network. One of the challenges in implementing this type of CP and UP separation may be how to identify operational issues for UP processing like types of failure, overload, packet loss or increased latency conditions without implementing overly complex CP and UP coordination methodologies. Some proposed solutions to detect UP processing issues may involve application specific connection establishment failure detection. Other proposed solutions may include a custom implementation of statistics monitoring which is workload specific and raises an alarm to NFV management resources (e.g., a virtualized infrastructure manager (VIM) or an orchestrator) to take corrective action if a failure, overload, packet loss or increased latency condition is detected.

In some cases, at least a portion of UP processing is implemented in hardware such as a network interface card (NIC) or a configurable logic circuitry such as a field programmable gate array (FPGA) or an application specific integrated circuit (ASIC). For these cases, a possible issue with the above-mentioned solutions may be that they are workload specific. Workload specific solutions may result in upgrades or changes for UP and/or CP processing resources that causes a need to update coordination algorithms. Also, UP and CP separation for SDN/NFV deployments may need overly complicated coordination algorithms if a new failure, overload, packet loss or increased latency condition is identified/detected that is geographic specific. This may cause NFV management resources to have to use different geographic-based criteria for each CP-UP pair. Different geographic-based criteria may add a high level of complexity to CP and UP coordination and cause SDN/NFV deployments utilizing CP and UP separation to be less scalable and add an undesirable amount of overhead to handle this potentially high level of complexity.

Figure 1:
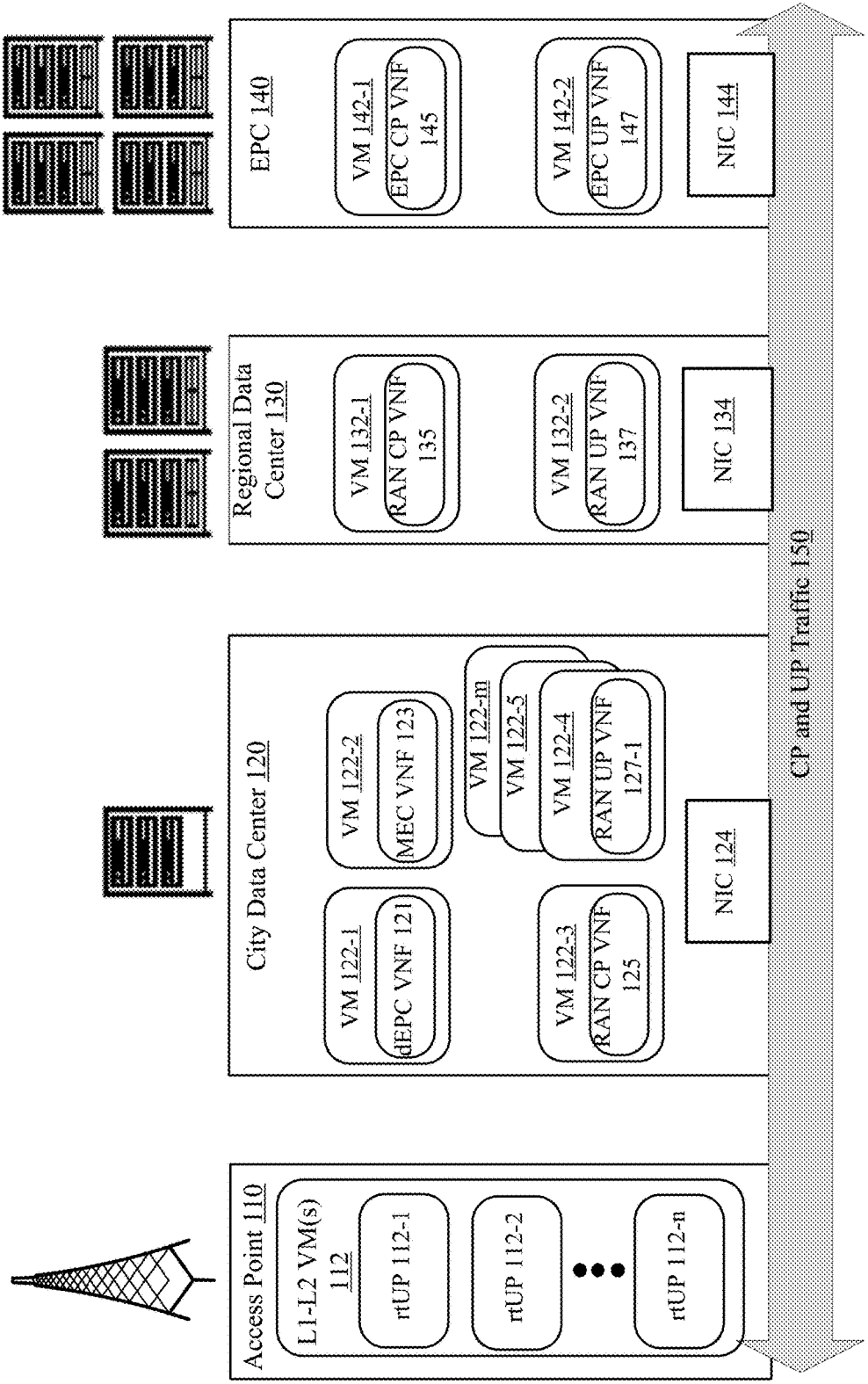
FIG. 1 illustrates an example system.

FIG. 1 illustrates an example system 100. In some examples, as shown in FIG. 1, system 100 includes an access point 110, a city data center 120, a regional data center 130 and an evolved packet core (EPC) 140. For these examples, system 100 may be operational elements of a communication network where access point 110, city data center 120, regional data center 130 or EPC 140 may be located in diverse or different geographical locations. The communication network including system 100 may operate according to various 3GPP specifications specifying CUPS for SDN/NFV types of deployments. For SDN/NFV types of deployments, computing elements located at access point 110, city data center 120, regional data center 130 or EPC 140 may provide various types of application services (e.g., communication services, gaming services, storage services, computing services, video streaming services, audio streaming services, etc.) for various types of devices or user equipment that may wirelessly couple to system 100 via access point 110. These types of network services, for example, may cause CP and UP traffic 150 to flow between access point 110, city data center 120, regional data center 130 or EPC 140. As described more below, the types of network services may include radio access network (RAN) UP and/or CP processing by computing elements located at access point 110, city data center 120, regional data center 130 or EPC 140.

According to some examples, access point 110 may include an Evolved Node B (eNB) to wirelessly couple to one or more types of devices that may include, but are not limited to, mobile devices or Internet of Things (IoT) devices. Mobile devices or IoT devices may also be referred to as user equipment (UE). As shown in FIG. 1, access point 110 may include one or more level 1 or level 2 (L1-L2) virtual machines (VM(s)) 112. Although not shown in FIG. 1, L1-L2 VM(s) 112 may be supported by computing resources (e.g., processors, memory, storage, networking interfaces) located at or with access point 110. For example, housed within one or more servers or computing platforms located in a structure located at or physically near a base of an antenna array tower for an eNB.

Also, as shown in FIG. 1, L1-L2 VM(s) 112 may include real-time UPs (rtUPs) 112-1 to 112-$n$, where "n" represents any positive whole integer greater than 2. In some examples, rtUPs 112-1 to 112-$n$ may represent separate processing resources allocated to support L1-L2 VM(s) 112 that may be further allocated to support application services provided to UEs wirelessly coupling to system 100 through access point 110. For example, a first type of application service (e.g., a video streaming service) may be supported by rtUP 112-1, a second type of application service (e.g., a voice communication service) may be supported by rtUP 112-2 and a third type of application service (e.g., a storage service) may be supported by rtUP 122-$n$. The types of UP processing supported by rtUPs 112-1 to 112-n may include, but are not limited to, UP processing related to L1-L2 protocols associated with physical channels (e.g., PHY interface), transport channels (e.g., medium access control (MAC)), or logical channels (e.g., radio link control (RLC)) of a long term evolution (LTE) eNB protocol stack utilized to receive or transmit UP traffic to UEs wirelessly coupled to system 100. For these examples, in SDN/NFV types of deployments that implement CUPS, level 3 (L3) processing may be primarily or entirely associated with CP processing that is not supported by L1-L2 VM(s) 112. Rather, as described more below, CP processing is supported by computing resources located at city data center 120, regional data center 130 or EPC 140.

In some examples, as shown in FIG. 1, city data center 120 may include VMs 122-1 to 122-m, where "m" represents any whole integer greater than 5. Although not shown in FIG. 1, VMs 122-1 to 122-m may be supported by computing resources located at or with city data center 120. An amount of computing resources arranged to support VMs 122-1 to 122-m may be substantially greater at city data center 120 compared to computing resources arranged to support L1-L2 VM(s) 112 at access point 110. For example, housed within multiple computing platforms, servers or racks located at city data center 120.

According to some examples, VM 122-1 may be arranged to execute one or more VNFs to support various types of management related CP processing at city data center 120 for UEs wirelessly coupled to system 100 through access point 110. For example, VM 122-1 may execute city data center EPC (dEPC) VNF 121. dEPC VNF 121 may process at least some control functions of a system architecture evolution (SAE) for system 100. For these examples, dEPC VNF 121 may support mobility management entity (MME), serving gateway (SG), PDN gateway (PGW), home subscriber server (HSS), access network discovery and selection function (ANDSF) or evolved packet data gateway (ePDG).

In some examples, VM 122-2 may be arranged to execute one or more VNFs to support multi-access edge computing (MEC) for UEs wirelessly coupled to system 100 through access point 110. For example, VM 122-2 may execute MEC VNF 123. By being executed by compute resources located in city data center 120, MEC VNF 123 may provide some processing tasks to UEs wirelessly coupled to system 100 via an operational element that is likely located physically closer to these UEs (e.g., at the computing edge of system 100) compared to other operational elements of system 100 located at regional data center 130 or EPC 140. Closer physical proximity of the computing resources executing MEC VNF 123 may allow for flexible and rapid deployment of new application services to these UEs. Moving the computing resources executing MEC VNF 123 closer to UEs may also reduce traffic loads between UEs and regional data center 130 and/or EPC 140.

According to some examples, VM 122-3 may be arranged to execute one or more VNFs to support radio access network (RAN) CP processing for UEs wirelessly coupled to system 100. For example, VM 122-3 may support RAN CP VNF 125. Examples of RAN CP processing may include, but are not limited to, radio resource control (RRC) protocol processing, stream control transmission (SCTP) processing, network-attached storage (NAS) protocol processing, or S1 application protocol (S1AP) processing. For these examples, RAN CP VNF 125 may provide CP processing for one or more application services requested by and/or provided to UEs wirelessly coupling to system 100 through access point 110. RAN CP VNF 125 may process control information related with supporting and/or providing these application services and forwarding CP information or traffic to operational elements located at regional data center 130 or EPC 140.

In some examples, VMs 122-4 to 122-m may be arranged to execute multiple VNFS to support RAN UP processing for UEs wirelessly coupled to system 100. For example, VMs 122-4 to 122-m may execute RAN UP VNFs 127-1 to 127-n, respectively. For these examples, RAN UP VNFs 127-1 to 127-n may process UP information received from rtUPs 112-1 to 112-n, respectively. As mentioned previously, rtUPs 112-1 to 112-n may support UP processing related to L1-L2 protocols for three different application services being used by UEs wirelessly coupling to system 100. In some examples, UP processing may include forwarding/routing UP data between the UEs and sources of at least a portion of the UP data located within city data center 120, regional data center 130, EPC 140, a network coupled with system 100 or other location. The sources (not shown in FIG. 1) may include, but are not limited to, video servers storing video content, social media services storing social media content, other UEs sharing face-to-face video content. The sources (not shown in FIG. 1) may include, but are not limited to, video servers storing video content, social media services storing social media content, other UEs sharing face-to-face video content.

According to some examples, as shown in FIG. 1, city data center 120 includes NIC 124. For these examples, NIC 124 may receive and transmit at least a portion of CP and UP traffic 150 at/from city data center 120 from/to access point 110, regional data center 130 or EPC 140. NIC 124 may be a NIC that includes logic and/or features to monitor CP traffic flowing from/to dEPC VNF 121 or from/to RAN CP VNF 125. As described in more detail below, the logic and/or features of the NIC may compare expected CP traffic (e.g., based on heuristic data) to monitored/observed CP traffic to determine if spikes in an amount of CP traffic flowing from/to dEPC VNF 121 or from/to RAN CP VNF 125 indicates a potential failure of VNFs supporting UP processing and requires mitigating actions. The expected CP traffic may be compared to monitored/observed CP traffic that was monitored/observed over a monitoring time window. The monitoring time window may be over a given time period of a 24-hour time period (e.g., from 4-5 PM).

In some examples, as shown in FIG. 1, regional data center 130 may include VMs 132-1 and 132-2. Although not shown in FIG. 1, VMs 132-1 and 132-2 may be supported by computing resources located at or with regional data center 130. An amount of computing resources arranged to support VMs 132-1 or 132-2 may be substantially greater at regional data center 130 compared to computing resources arranged to support VMs 122-1 to 122-m at city data center 120. For example, hundreds of servers housed within multiple racks located at regional data center 130.

According to some examples, VM 132-1 may be arranged to execute one or more VNFs to support RAN CP processing for UEs wirelessly coupled to system 100. For example, VM 132-1 may execute RAN CP VNF 135. For these examples, RAN CP VNF 135 may provide CP processing for one or more application services requested and/or provided to UEs wirelessly coupling to system 100 through access point 110 and city data center 120. RAN CP VNF 135 may process control information related to supporting these application services at either city data center 120 or regional data center 130 and forwarding CP information or traffic to operational elements located at EPC 140.

In some examples, VM 132-2 may be arranged to execute one or more VNFs to support RAN UP processing for UEs wirelessly coupled to system 100. For example, VM 132-2 may execute RAN UP VNF 137. For these examples, RAN UP VNF 137 may process UP information received from RAN UP VNFs 127-1 to 127-*n*. In some examples, UP processing may include routing UP data between the UEs and sources located within regional data center 130, EPC 140 or a network coupled with system 100.

According to some examples, as shown in FIG. 1, regional data center 130 includes NIC 134. For these examples, NIC 134 may receive and transmit at least a portion of CP and UP traffic 150 at/from regional data center 130 from/to access point 110, city data center 120 or EPC 140. NIC 134 may be a NIC that includes logic and/or features to monitor CP traffic flowing from/to RAN CP VNF 135 and compare characteristics of CP traffic flowing from/to RAN CP VNF 135 to expected characteristics of CP traffic (e.g., based on heuristic data) to determine whether a potential failure of VNFs supporting UP processing at city data center 120 requires mitigating actions. The expected characteristics of the CP traffic may be compared to monitored/observed CP traffic that was monitored/gathered over a monitoring time window.

In some examples, as shown in FIG. 1, EPC 140 may include VMs 142-1 and 142-2. Although not shown in FIG. 1, VMs 142-1 and 142-1 may be supported by computing resources located at or with EPC 140. An amount of computing resources arranged to support VMs 142-1 and 142-2 may be more or less than an amount of computing resources arranged to support VMs at city data center 120 and/or regional data center 130.

According to some examples, VM 142-1 may be arranged to execute one or more VNFs to support EPC CP processing for UEs wirelessly coupled to system 100. For example, VM 142-1 may execute EPC CP VNF 145. EPC CP VNF 145 may process at least a portion of EPC CP functions of the SAE for system 100 related to, but not limited to, control functions for MME, SG, PGW, HSS, ANDSF or ePDG.

In some examples, VM 142-2 may be arranged to execute one or more VNFs to support EPC UP processing for UEs wirelessly coupled to system 100. For example, VM 142-1 may execute EPC UP VNF 147. EPC CP VNF 147 may process at least a portion of EPC UP functions related, but not limited to, control functions for MME, SG, PGW, HSS, ANDSF or ePDG.

According to some examples, as shown in FIG. 1, EPC 140 includes NIC 144. For these examples, NIC 144 may receive and transmit at least a portion of CP and UP traffic 150 at/from EPC 140 from/to access point 110, city data center 120 or regional data center 130. NIC 144 may be a NIC that includes logic and/or features to monitor CP traffic flowing from/to EPC CP VNF 145 and compare characteristics of CP traffic flowing from/to EPC CP VNF 145 to expected characteristics of CP traffic (e.g., based on heuristic data) to determine whether a potential failure of EPC UP VNF 147 supporting EPC UP processing at EPC 140 or dEPC UP VNF 121 supporting EPU UP processing at city data center 120 requires mitigating actions. The expected characteristics of the CP traffic may be compared to monitored/observed CP traffic that was monitored/gathered over a monitoring time window.

In some examples, VMs included in access point 110, city data center 120, regional data center 130 or EPC 140, as mentioned previously, may be supported by composed computing resources physically located on one or more computing platforms, servers or racks. VMs supported by composed computing resources at access point 110, city data center 120, regional data center 130 or EPC 140 may be managed or controlled by a respective hypervisor/VM manager (VMM). Also, NFV management resources such as an NFV orchestrator or a VIM (both not shown in FIG. 1) may be capable of controlling/managing VMs supported by computing resources at access point 110, city data center 120, regional data center 130 or EPC 140 through their respective hypervisor/VMM.

According to some examples, a VM is a software computer that, like a physical computer, runs an operating system and applications. The VM may be comprised of a set of specification and configuration files and is backed by the physical computing resources. Also, a hypervisor or VMM is computer software, firmware or hardware that creates and runs VMs. A computing platform on which a hypervisor runs one or more VMs may be called a host machine, and each VM may be called a guest machine. The hypervisor or VMM presents the guest operating systems with a virtual operating platform and manages the execution of the guest operating systems. Multiple instances of a variety of operating systems may share virtualized/composed computing resources: for example, Linux, Windows, and macOS instances can all run on a single physical processor with multiple cores. This contrasts with operating-system-level virtualization, where all instances (usually called containers) must share a single kernel, though the guest operating systems can differ in user space, such as different Linux distributions with the same kernel.

In some examples, NIC 124, NIC 134 or NIC 144 may be a computer hardware component that connects computing resources at city data center 120, regional data center 130 or EPC 140 through a network to route data (e.g., in data packets). The routed data may include, but is not limited to, CP and UP traffic 150. Early NICs were commonly implemented on expansion cards that plugged into a computer bus of a host computing platform. A low cost and ubiquity of some technology standards such as the Ethernet standard means that most newer computing platforms have a network interface built into one or more motherboards included in these newer computing platforms. Modern NICs offer advanced features such as interrupt and direct memory access (DMA) interfaces to processors, support for multiple receive and transmit queues, partitioning into multiple logical interfaces, and on-NIC processing such as a TCP offload engine. In some examples, modern NICs may be deemed as "smart NICs" and may include configurable logic circuits such as a field programmable gate array (FPGA) to enable these smart NICs to be configured to meet various operational scenarios.

Figure 2:
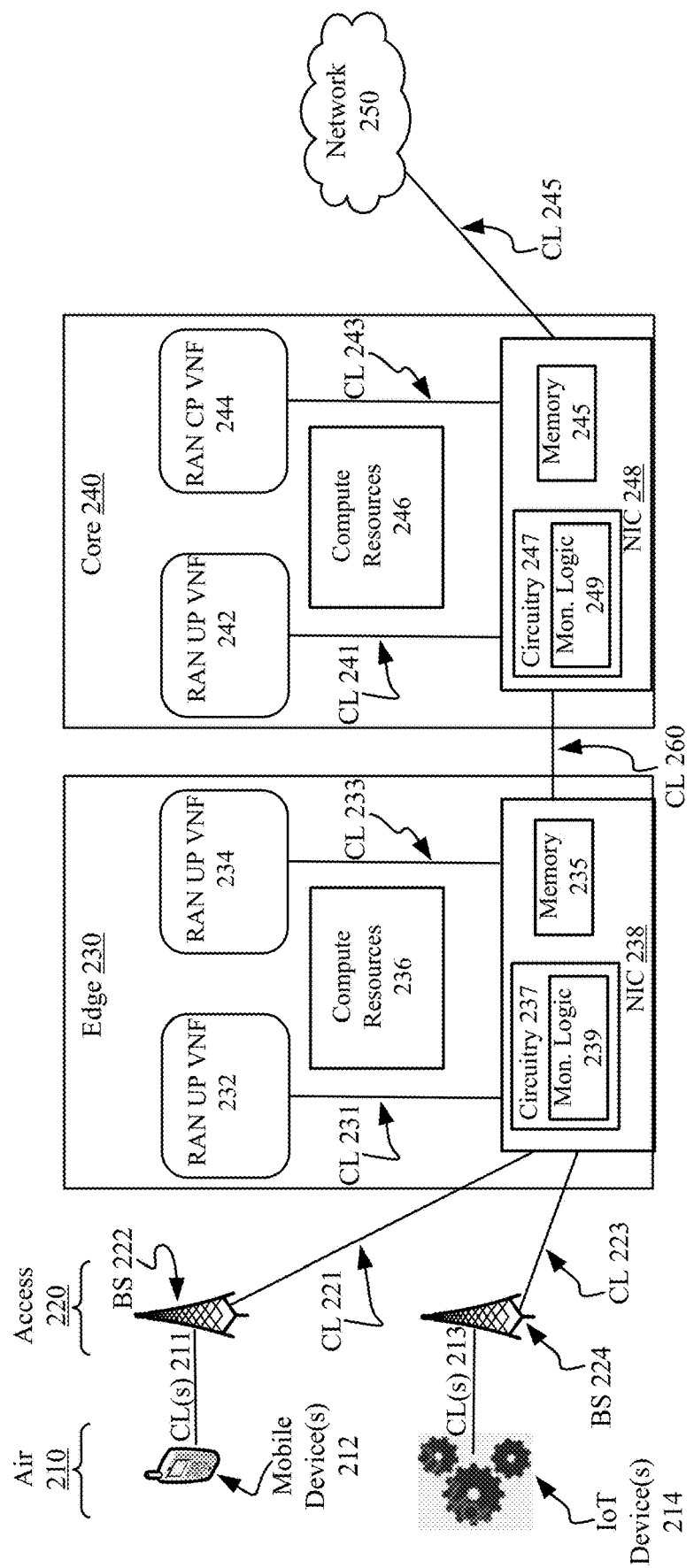
FIG. 2 illustrates an example second system.

FIG. 2 illustrates an example system 200. In some examples, as shown in FIG. 2, system 200 includes an air 210, an access 220, an edge 230 and a core 240. For these examples, air 210, access 220, edge 230 and core 240 of system 200 may represent various portions of a communication network. For example, air 210 may include a portion that has UEs such as one or more mobile device(s) 212 or one or more IoT device(s) 214 (e.g., vehicles, sensors, home appliances, etc.) that are capable of coupling through respective communication links (CLs) 211 and 213 to base stations (BSs) 222 and 224 via an air or wireless interface to gain access to or couple with the communication network of system 200. As shown in FIG. 2, BSs 222 and 224 of access 220 may then couple to edge 230 through respective CLs 221 and 223 coupled with NIC 238 (e.g., via wired and/or optical interfaces). Edge 230 may further couple with core 240 through CL 260 coupled between NIC 238 and NIC 248

(e.g., via a wired and/or optical interface). Also, core 240 may couple with network 250 through CL 245 coupled with NIC 248 (e.g., via a wired and/or optical interface).

According to some examples, edge 230 may be similar to city data center 120 mentioned above for FIG. 1, and as shown in FIG. 2, edge 230 includes compute resources 236. For these examples, compute resources 236 may be arranged or composed to support VMs (not shown) that may execute a plurality of RAN UP VNFs such as RAN UP VNFs 232 and 234. In some examples, RAN UP VNFs 232 and 234 may support RAN UP processing for UEs wirelessly coupled to system 200. For example, mobile device(s) 212 coupled to edge 230 through CL 211 to BS 222 and CL 221 to NIC 238. The RAN UP processing may be related to an application service requested by mobile device(s) 212 such as, but not limited to, communication services, gaming services, storage services, computing services, video streaming services or audio streaming services.

In some examples, core 240 may be similar to regional data center 130 mentioned above for FIG. 1 and, as shown in FIG. 2, core 240 includes compute resources 246. For these examples, compute resources 246 may be arranged or composed to support VMs (not shown in FIG. 2) that may execute one or more RAN UP VNFs such as RAN UP VNF 242. In some examples, RAN UP VNF 242 may provide additional or enhanced UP processing for UEs wirelessly coupled to system 200. For example, additional or enhanced UP processing compared to UP processing provided by RAN UP VNF 232 or RAN UP VNF 234 at edge 230 to mobile device(s) 212.

According to some examples, system 200 may be an SDN/NFV type of deployment that implements CUPS such that RAN UP processing is performed at edge 230 and at core 240 while RAN CP processing is performed at only core 240. For these examples, compute resources 246 may be arranged or composed to support VMs (not shown in FIG. 2) that may execute one or more RAN CP VNFs such as RAN CP VNF 244. RAN CP VNF 244 may process control information related to supporting application services requested by UEs coupled with the communication network of system 200 such as mobile device(s) 212 or IoT devices 214.

According to some examples, as shown in FIG. 2, a NIC 238 at edge 230 includes a memory 235 and circuitry 237. For these examples, circuitry 237 may execute or implement a monitor logic 239. Monitor logic 239 may include logic and/or features to monitor CP traffic routed from edge 230 through NIC 238 to core 240 through CL 260. The CP traffic, for example, may be related to UP processing by RAN UP VNF 232 or RAN UP VNF 234. As described in more detail below, the logic and/or features of monitor logic 239 may utilize heuristic data (e.g., to determine expected CP traffic) to determine if spikes in an amount of CP traffic routed from edge 230 through NIC 238 to core 240 indicates a potential failure of RAN UP VNF 232 or RAN UP VNF 234. The heuristic data may at least be temporarily stored in memory 235. In some examples, mitigating actions may include monitor logic 239 causing UP traffic to be routed away from a failing RAN UP VNF to a non-failing RAN UP VNF or possibly causing a new RAN UP VNF to be instantiated and the UP traffic to be routed to the new RAN UP VNF. For example, if RAN UP VNF 232 was determined to be at risk of failing, monitor logic 239 may cause UP traffic routed through CL 231 to RAN UP VNF 232 to be rerouted through CL 233 to RAN UP VNF 234.

In some examples, as shown in FIG. 2, a NIC 248 at core 240 includes a memory 245 and circuitry 247. For these examples, circuitry 247 may execute or implement a monitor logic 249. Monitor logic 249 may be similar to monitor logic 239 in that it includes logic and/or features to monitor CP traffic related to RAN UP processing by RAN UP VNF 232 or 234. The CP traffic monitored by monitor logic 249 is routed from edge 230 through NIC 238 to core 240 through CL 260 and then through NIC 248 and CL 243 to RAN CP VNF 244. Monitor logic 249 may also monitor CP traffic related to RAN UP processing by RAN UP VNF 242 routed to RAN CP VNF 244 through NIC 248. As described in more detail below, the logic and/or features of monitor logic 249 may also utilize heuristic data (e.g., at least temporarily stored in memory 245) to determine if spikes in an amount of CP traffic routed from edge 230 through NIC 238 to core 240 or between RAN UP VNF 242 and RAN CP VNF 244 indicates a potential failure of RAN UP VNF 232, RAN UP VNF 234 or RAN UP VNF 242. In some examples, mitigating actions may include monitor logic 249 causing UP traffic to be routed away from a failing RAN UP VNF to a non-failing RAN UP VNF or possibly causing a new RAN UP VNF to be instantiated and the UP traffic to be routed to the new RAN UP VNF. In other examples, monitor logic 249 may mitigate issues by moving a RAN UP VNF physically closer to the UE using or consuming an application service. For example, if RAN UP VNF 242 was determined to be at risk of failing, monitor logic 249 may cause RAN UP VNF 242 to shut down and move the UP processing work load to RAN UP VNF 232 or RAN UP VNF 234 at edge 230.

In some examples, memory 235 at NIC 238 or memory 245 at NIC 248 may be composed of one or more memory devices or dies which may include various types of volatile and/or non-volatile memory. Types of volatile memory may include, but are not limited to, random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM). Types of non-volatile memory may include, but are not limited to, non-volatile types of memory such as three-dimensional (3-D) cross-point memory. The types of non-volatile memory may be byte or block addressable and may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other types of non-volatile memory.

FIG. 3 illustrates example heuristic information 300. In some examples, as shown in FIG. 3, heuristic information 300 may include a user plane data 310 and a control plane data 320 plotted over a 24-hour time period. For these examples, user plan data 310 may depict a UP traffic daily profile for various types of application services over a 24-hour time period and control plane data 320 may depict a corresponding expected CP traffic daily profile over the same 24-hour time period. The line plot shown in control plane data 320 may indicate an expected percentage of CP traffic flows that correspond to UP traffic flows through a communication network throughout the 24-hour time period. In some examples, an expected percentage of CP traffic flows may increase during peak hours of UP traffic flows (e.g., 8-10 PM) due to a higher number of individual UEs accessing a communication network as compared to off peak hours of UP traffic flows (e.g., 2-5 AM).

According to some examples, as shown in FIG. 3, user plane data 310 depiction of UP traffic and the corresponding CP traffic profile of control plane data 320 may serve as heuristic data via which monitor logic at a NIC (e.g., monitor logic 239 or 249) may utilize to determine expected CP traffic and then determine if spikes in an amount of observed CP traffic routed to/from VNFs arranged to process CP information indicate possible failure of a UP processing VNF. For example, a RAN UP VNF at a city or regional data center is potentially overloaded providing application services to UEs. For these examples, the monitor logic at the NIC may utilize a monitoring time window over a given time period of a 24-hour time period to gather information on CP traffic flows and then compare the gathered information to the heuristic data included in control plane data 320 to determine whether the monitored CP traffic flows are above/below a threshold amount or value over the monitoring time window. In some examples, if below the threshold, no actions are taken. If above the threshold, mitigation actions may be taken to include rerouting UP data traffic to a different UP processing VNF. Following this threshold determination, the monitoring information may be reset or discarded to avoid extreme data collection In some examples, a threshold amount or value may be based on historical operating experience via which UP processing VNF failures were precluded by spikes in CP traffic above expected CP traffic amounts. Also, a guard band may be associated with the threshold amount so that mitigating actions can be implemented before failure occurs. For example, if CP traffic spikes that are twice or 100% more than expected typically lead to VNF failures, then a threshold amount may be set to a value of 75% above expected CP traffic amounts. The guard band may enable mitigating actions to occur before VNF failures occur.

Figure 4:
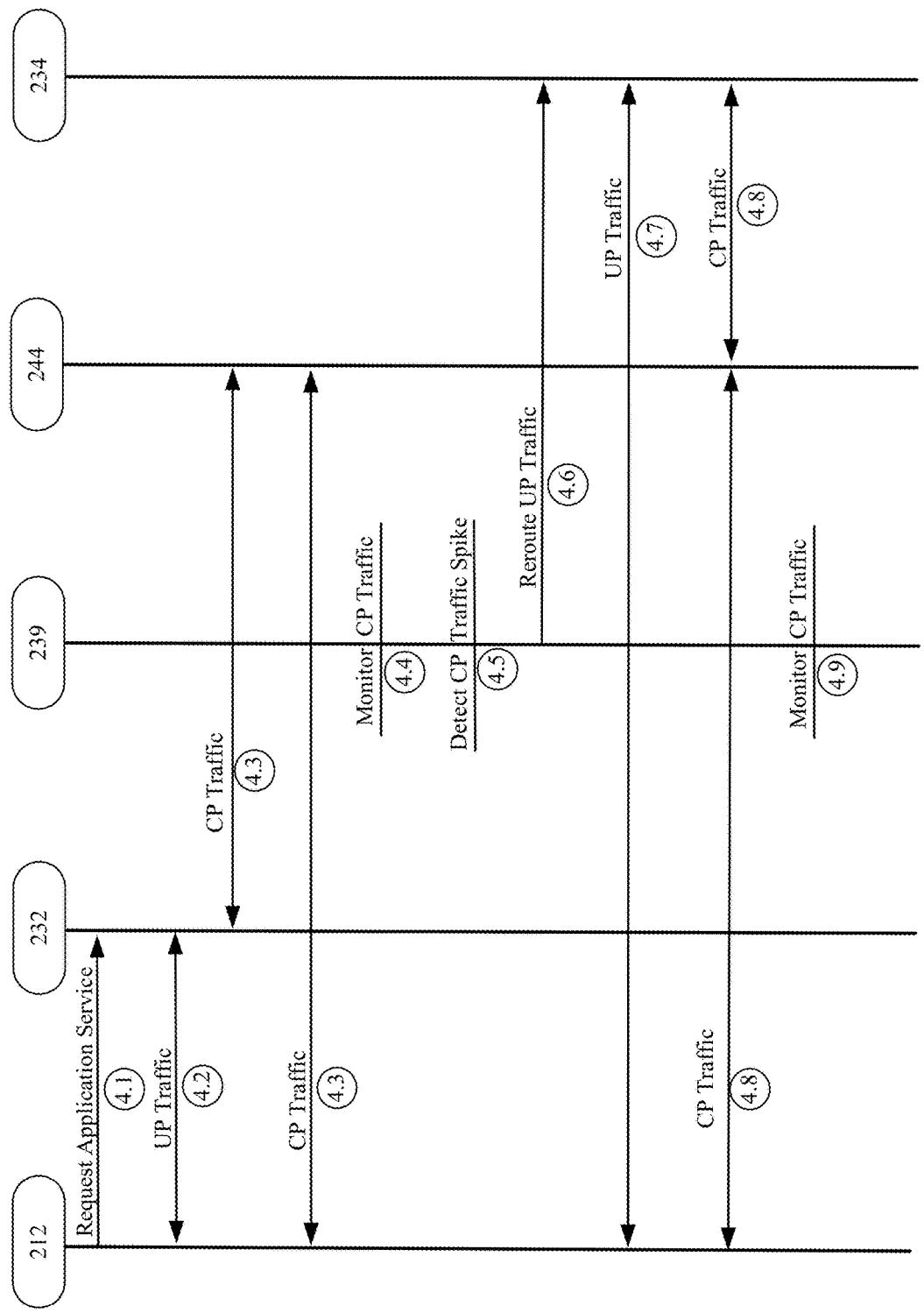
FIG. 4 illustrates an example first process.

FIG. 4 illustrates an example process 400. In some examples, process 400 may depict a process of monitoring CP network traffic to determine whether mitigating actions should be taken in relation to UP processing by VNFs in an SDN/NFV deployment utilizing CP and UP separation (CUPS). For these examples, elements of system 200 as shown in FIG. 2, may be related to process 400. These elements of system 200 may include, but are not limited to, mobile device(s) 212, RAN UP VNFs 232, 234, monitor logic 239 of NIC 238 and RAN CP VNF 244.

Beginning at process 4.1 (Request Application Service), mobile device(s) 212 may request an application service being fulfilled or provided by RAN UP VNF 232 at edge 230. The application service may include, but is not limited to, a communication service (e.g., voice and/or video), a gaming service, a storage service, a computing service, a video stream service or an audio streaming service.

Moving to process 4.2 (UP Traffic), UP traffic may flow between mobile device(s) 212 and RAN UP VNF 232 while the requested application service is being provided. The UP traffic, for example, may include streaming video/audio associated with a communication service such as a face-to-face video/audio communication. UP traffic may include video/audio coming from mobile device(s) 212 and video/audio from a separate mobile device being processed and then streamed through RAN UP VNF 232 to mobile device (s) 212.

Moving to process 4.3 (CP Traffic), CP traffic may flow between mobile device(s) 212 and RAN CP VNF 244 and may also flow between RAN UP VNF 232 and RAN CP VNF 242 while the requested application service is being provided. CP traffic may include control information related to maintaining mobile device(s) 212 network connection and to operational control information from RAN UP VNF 232 while providing the requested application service. The control information for mobile device(s) 212 may include, but is not limited to, information related to connection establishment or attachment procedures for mobile device(s) 212 being conducted via use of RRC, SCTP, NAS or S1AP protocols. The operation control information for RAN UP VNF 232 may include, but is not limited to, information related to RRC protocol processing, SCTP processing, NAS protocol processing S1AP processing.

Moving to process 4.4 (Monitor CP Traffic), logic and/or features of monitoring logic 239 at NIC 238 may monitor the CP traffic flowing between mobile device(s) 212 and RAN CP VNF 244 and between RAN UP VNF 232 and RAN CP VNF 242. In some examples, monitoring logic may monitor the CP traffic over a monitoring time window and compare the monitored CP traffic to expected CP traffic (e.g., based on heuristic data) to determine whether the CP traffic flow is above or below a threshold amount or value. The threshold amount or value, for example, may indicate a CP traffic flow amount above which RAN UP VNF 232 may begin to fail to provide the application service to all or a portion of mobile device(s) 212.

Moving to process 4.5 (Detect CP Traffic Spike), logic and/or features of monitoring logic 239 may determine that the CP traffic flow has risen above the threshold amount or value and thus determine a CP traffic spike has occurred and mitigating actions are needed. According to some examples, individual mobile devices of mobile device(s) 212 or all mobile device(s) 212 may have a detected CP traffic spike.

Moving to process 4.6 (Reroute UP Traffic), logic and/or features of monitoring logic 239 may cause UP traffic to be rerouted to flow to RAN UP VNF 234 instead of RAN UP VNF 232. In some examples, when individual mobile devices of mobile device(s) 212 have detected CP traffic spikes, their respective UP traffic may be rerouted to RAN UP VNF 234 to reduce a possible burden on RAN UP VNF 232. In other examples, when mobile device(s) 212, in aggregate, have a detected CP traffic spike, all UP traffic may be rerouted to RAN UP VNF 234.

Moving to process 4.7 (UP Traffic), UP traffic may now flow between RAN UP VNF 234 and mobile device(s) 212 in an example where all UP traffic is routed to RAN UP VNF 234.

Moving to process 4.8 (CP Traffic) CP traffic may flow between mobile device(s) 212 and RAN CP VNF 244 and may also now flow between RAN UP VNF 234 and RAN CP VNF 244 while the requested application service is being provided.

Moving to process 4.9 (Monitor CP Traffic), logic and/or features of monitoring logic 239 at NIC 238 may monitor the CP traffic flowing between mobile device(s) 212 and RAN CP VNF 244 and between RAN UP VNF 234 and RAN CP VNF 244. Similar to process 4.4, the monitored CP traffic may be compared to heuristic data to determine whether the CP traffic flow is above or below a threshold amount or value. Process 400 may then come to an end.

Figure 5:
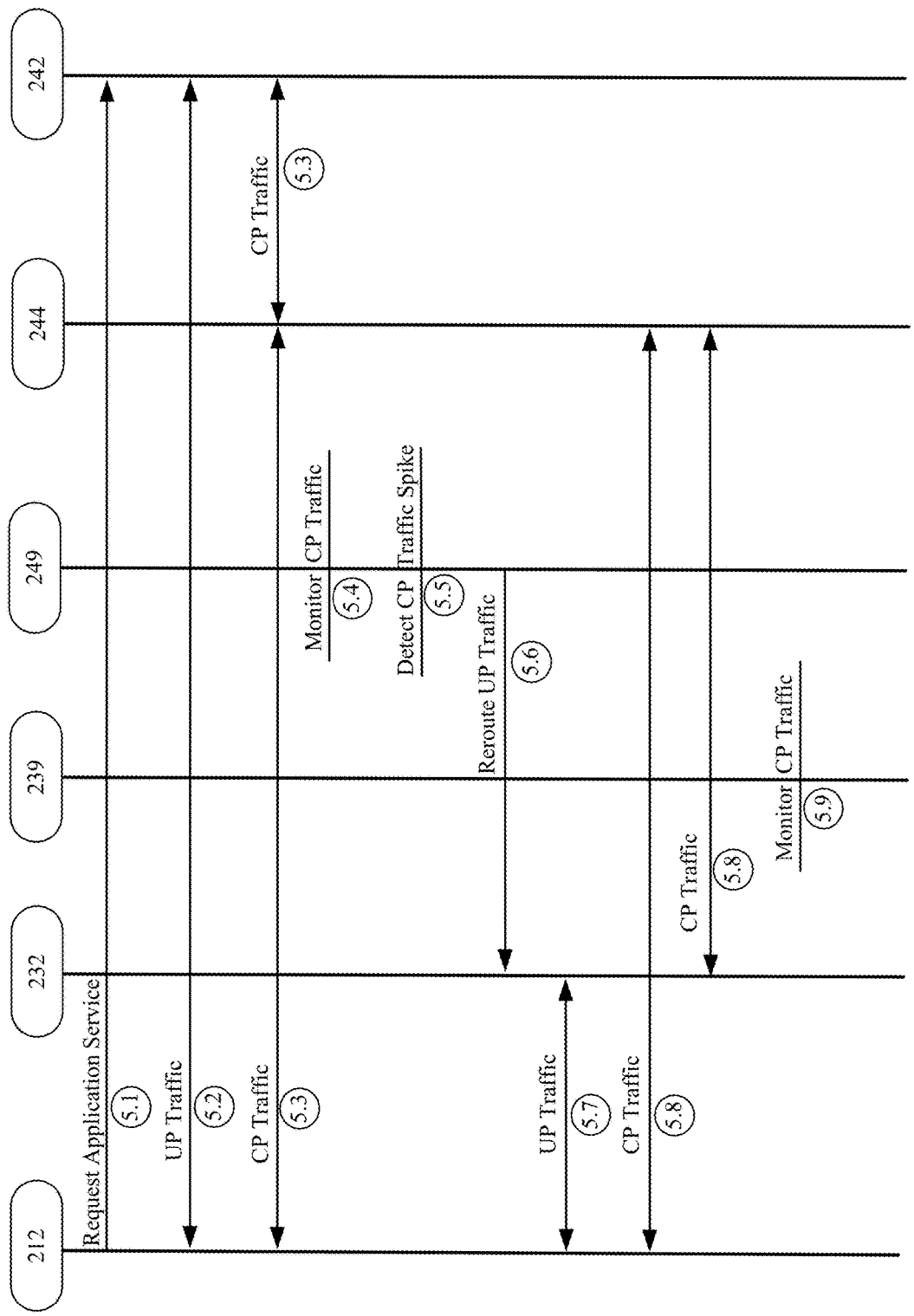
FIG. 5 illustrates an example second process.

FIG. 5 illustrates an example process 500. In some examples, process 500 may depict a process of monitoring CP network traffic to determine whether mitigating actions should be taken in relation to UP processing by VNFs in an SDN/NFV deployment utilizing CP and UP separation (CUPS). For these examples, elements of system 200 as shown in FIG. 2, may be related to process 500. These elements of system 200 may include, but are not limited to, mobile device(s) 212, RAN UP VNF 232, RAN UP VNF 242, RAN CP VNF 244, monitor logic 239 of NIC 238 and monitor logic 249 of NIC 248.

Beginning at process 5.1 (Request Application Service), mobile device(s) 212 may request an application service being fulfilled or provided by RAN UP VNF 242 at core 240. The application service may include, but are not limited to, a communication service, a gaming service, a storage service, a computing service, a video stream service or an audio streaming service.

Moving to process 5.2 (UP Traffic), UP traffic may flow between mobile device(s) 212 and RAN UP VNF 242 while the requested application services is being provided. The UP traffic, for example, may include video streaming associated with a video stream service such as a video stream service associated with an over-the-top video stream service (e.g., Netflix). UP traffic may include video streaming requests coming from mobile device(s) 212 and requested video streamed through RAN UP VNF 242 to mobile device(s) 212.

Moving to process 5.3 (CP Traffic), CP traffic may flow between mobile device(s) 212 and RAN CP VNF 244 and may also flow between RAN UP VNF 242 and RAN CP VNF 244 while the requested application service is being provided. CP traffic may include control information related to maintaining mobile device(s) 212 network connection and to operational control information from RAN UP VNF 242 while providing the requested application service. The control information for mobile device(s) 212 may include, but is not limited to, information related to connection establishment or attachment procedures for mobile device(s) 212 being conducted via use of RRC, SCTP, NAS or S1AP protocols. The operation control information for RAN UP VNF 242 may include, but is not limited to, information related to RRC protocol processing, SCTP processing, NAS protocol processing S1AP processing.

Moving to process 5.4 (Monitor CP Traffic), logic and/or features of monitoring logic 249 at NIC 248 may monitor the CP traffic flowing between mobile device(s) 212 and RAN CP VNF 244 and between RAN UP VNF 242 and RAN CP VNF 244. In some examples, monitoring logic may monitor the CP traffic over a monitoring time window and compare the monitored CP traffic to expected CP traffic (e.g., based on heuristic data) to determine whether the CP traffic flow is above or below a threshold amount or value. The threshold amount or value, for example, may indicate a CP traffic flow amount above which RAN UP VNF 242 may begin to fail to provide the application service to all or a portion of mobile device(s) 212.

Moving to process 5.5 (Detect CP Traffic Spike), logic and/or features of monitoring logic 249 may determine that the CP traffic flow has risen above the threshold amount or value and thus determine a CP traffic spike has occurred and mitigating actions are needed. According to some examples, individual mobile devices of mobile device(s) 212 or all mobile device(s) 212 may have a detected CP traffic spike.

Moving to process 5.6 (Reroute UP Traffic), logic and/or features of monitoring logic 249 may cause UP traffic to be rerouted to flow to RAN UP VNF 232 at edge 230 instead of RAN UP VNF 242 at core 240. In some examples, when individual mobile devices of mobile device(s) 212 have detected CP traffic spikes, their respective UP traffic may be rerouted to RAN UP VNF 232 at edge 230 to provide UP processing for the application service at a geographic location closer to these individual mobile devices of mobile device(s) 212. In other examples, when mobile device(s) 212, in aggregate, have a detected CP traffic spike, all UP traffic may be rerouted to RAN UP VNF 232 at edge 230 that may be generally geographically closer to mobile device(s) 212 compared to RAN UP VNF 242 at core 240. Moving geographically closer may improve latency issues that may have been a cause for at least some of the detected CP traffic spike.

Moving to process 5.7 (UP Traffic), UP traffic may now flow between RAN UP VNF 232 and mobile device(s) 212 in an example where all UP traffic is routed to RAN UP VNF 232.

Moving to process 4.8 (CP Traffic) CP traffic may flow between mobile device(s) 212 and RAN CP VNF 244 and may also now flow between RAN UP VNF 232 and RAN CP VNF 244 while the requested application service is being provided.

Moving to process 4.9 (Monitor CP Traffic), logic and/or features of monitoring logic 239 at NIC 238 may now monitor the CP traffic flowing between mobile device(s) 212 and RAN CP VNF 244 and between RAN UP VNF 232 and RAN CP VNF 244. Similar to process 5.4, the monitored CP traffic may be compared to heuristic data to determine whether the CP traffic flow is above or below a threshold amount or value. Process 500 may then come to an end.

Figure 6:
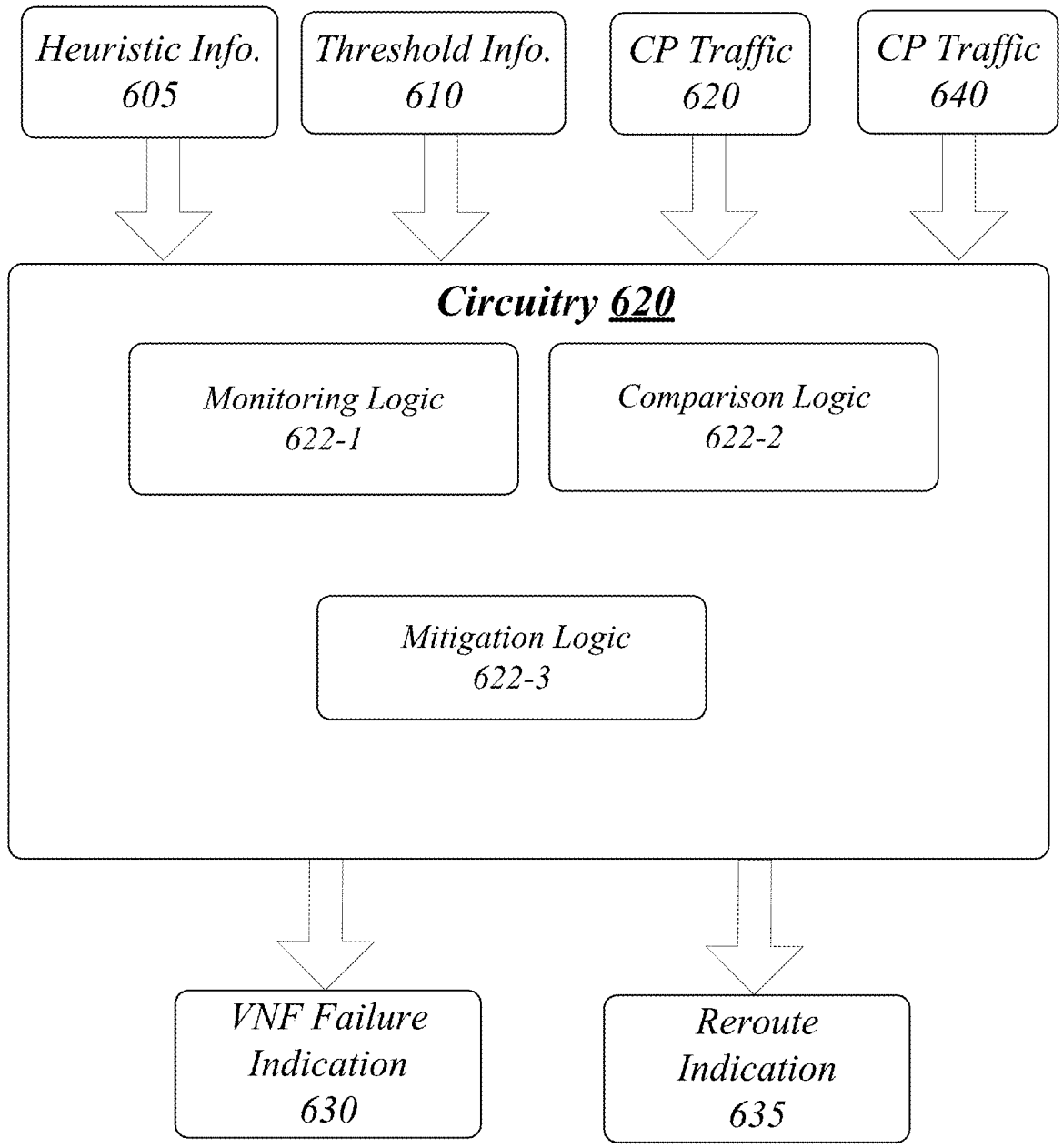
FIG. 6 illustrates an example block diagram for an apparatus.

FIG. 6 illustrates an example block diagram for apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be supported by circuitry 620. For these examples, circuitry 620 may be at an ASIC, FPGA, configurable logic, processor, processor circuit, central processor unit (CPU), or core of a CPU for a NIC, e.g., circuitry 237 or circuitry 247 for respective NICs 238 or 248 shown in FIG. 2. For these examples, the ASIC, FPGA, configurable logic, processor, processor circuit, CPU, or one or more cores of a CPU may support logic and/or features of a monitoring logic such as monitor logics 239 or 249 to facilitate monitoring control plane network traffic routed through at least portions of a communication network. Circuitry 620 may be arranged to execute one or more software or firmware implemented modules, components or logic 622-*a*. It is worthy to note that "a" and "b" and "c" and similar designators as used herein are intended to be variables representing any positive integer. Thus, for example, if an implementation sets a value for a=3, then a complete set of software or firmware for modules, components or logic 622-*a* may include logic 622-1, 622-2 or 622-3. The examples presented are not limited in this context and the different variables used throughout may represent the same or different integer values. Also, "logic", "module" or "component" may also include software/firmware stored in computer-readable media, and although types of logic are shown in FIG. 6 as discrete boxes, this does not limit these types of logic to storage in distinct computer-readable media components (e.g., a separate memory, etc.).

According to some examples, as mentioned above, circuitry 620 may include an ASIC, an FPGA, a configurable logic, a processor, a processor circuit, a CPU, or one or more cores of a CPU. Circuitry 620 may be all or at least a part of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors.

According to some examples, apparatus 600 may include monitoring logic 622-1. Monitoring logic 622-1 may be executed or implemented by circuitry 620 to monitor CP traffic between one or more UEs and a first VNF arranged to process the CP traffic for an application service provided to the one or more UEs through a second VNF arranged to process UP traffic for the application service, the UP traffic and the CP traffic routed through the NIC that include apparatus 600. For these examples, CP traffic 620 may include the monitored CP traffic between the one or more EUs and the first VNF.

In some examples, apparatus 600 may also include a comparison logic 622-2. Comparison logic 622-2 may be executed or implemented by circuitry 620 to compare, following a monitoring time window over a first time period of a time period (e.g., a 24-hour time period), monitored CP traffic to expected CP traffic for the application service during the first time period. For these examples, the heuristic information 605 may be obtained from a memory at the NIC and may include data to indicate the expected CP traffic over the time period to provide the application service to the one or more UEs.

According to some examples, apparatus 600 may also include a mitigation logic 622-3. Mitigation logic 622-3 may be executed or implemented by circuitry 620 to cause at least a first portion of the UP traffic to be routed to a third VNF arranged to process UP traffic based on the monitored CP traffic exceeding the threshold value during the monitoring time window. For these example, the threshold value may be included in threshold information 610. In some examples, the threshold value may be exceeded if monitored CP traffic is 75% greater than the expected CP traffic during the monitoring time window (examples are not limited to a 75% threshold). Mitigation logic 622-3 may cause a VNF failure indication 630 (e.g., to an NFV orchestrator or a VIM) to be sent to indicate that the first VNF may be failing. Mitigation logic 622-3 may also cause a reroute indication 635 to be sent to the third VNF to indicate that at the first portion of UP traffic is to be routed to the third VNF. Monitoring logic 622-1 may then monitor CP traffic 640 that may include CP traffic between the one or more UEs and the first VNF and/or the third VNF over a second monitoring time window over the 24-hour time period.

Various components of apparatus 600 or a NIC including apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example logic flow 700. Logic flow 700 may be representative of some or all of the operations executed by one or more logic, features, or devices described herein, such as apparatus 600. More particularly, logic flow 700 may be implemented by at least monitoring logic 622-1, comparison logic 622-2 or mitigation logic 622-3.

According to some examples, logic flow 700 at block 702 may monitor CP traffic between one or more UEs wirelessly coupled to a communication network and a first VNF arranged to process the CP traffic for an application service provided to the one or more UEs through a second VNF arranged to process UP traffic for the application service, the UP traffic and the CP traffic routed through a NIC. For these examples, monitoring logic 622-1 may monitor the CP traffic.

In some examples, logic flow 700 at block 704 may compare, following a monitoring time window over a first time period of a time period (e.g., a 24-hour time period), monitored CP traffic to expected CP traffic for the application service during the first time period. For these examples, comparison logic 622-2 may compare the monitored CP traffic to the expected CP traffic.

According to some examples, logic flow 700 at block 706 may cause at least a first portion of the UP traffic to be routed to a third VNF arranged to process UP traffic based on the comparison of the monitored CP traffic to the expected CP traffic. For these examples, mitigation logic 622-3 may cause at least the first portion of UP traffic to be routed to the third VNF.

FIG. 8 illustrates an example storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
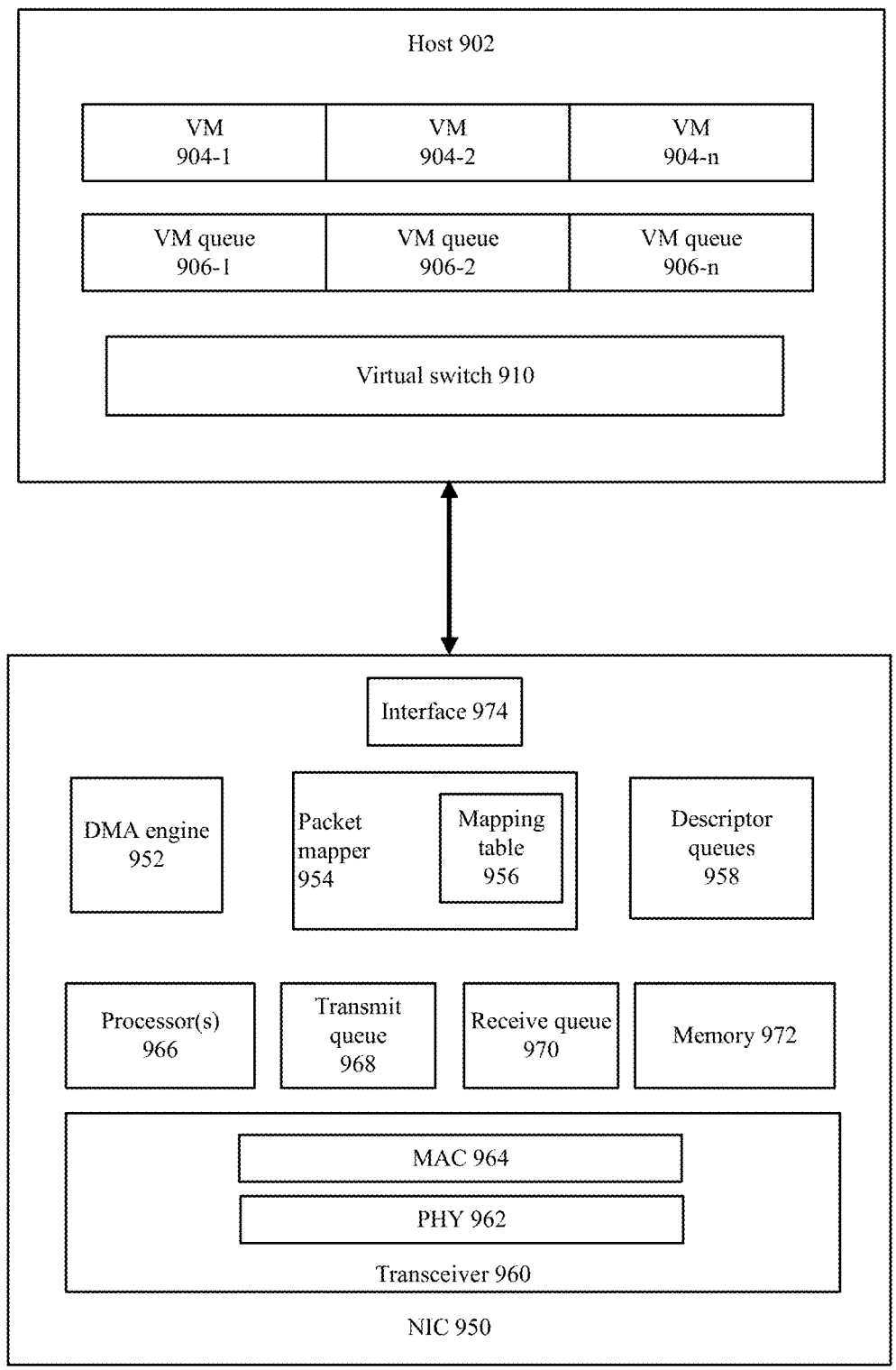
FIG. 9 illustrates an example third system.

FIG. 9 illustrates and example system 900. In some examples, as shown in FIG. 9, system 900 may include a host 902. Host 902 may be any computing platform with compute, interconnect, memory, storage, and network resources (not shown). For example, host 902 may include one or more processors, interconnects, one or more memory, one or more storage devices, and one or more network interfaces. Host 902 may support one or more virtual machines (VMs) 904 to 904-n. VMs 904-1 to 904-N may be any VM supported by host 902. Also, VM queues 906-1 to 906-n may be associated with respective VMs 904-1 to 904-N and may be included in memory resources maintained by host 902.

According to some examples, for a packet transmission, virtual switch 910 may detect that a transmit packet and/or descriptor is formed in a VM queue and a virtual switch 910 supported by host 902 may request the packet header, payload, and/or descriptor be transferred to a NIC 950 using a direct memory access (DMA) engine 952 located at NIC 950. For these examples, descriptor queues 958 may receive the descriptor for the packet to be transmitted. NIC 950 may transmit the packet. For example, a packet may have a header that identifies the source of the packet, a destination of the packet, and routing information of the packet. A variety of packet protocols may be used, including, but not limited to Ethernet, FibreChannel, Infiniband, or Omni-Path. Host 902 may transfer a packet to be transmitted from a VM queue from among VM queues 906-1 to 906-n to NIC 950 for transmission without use of an intermediate queue or buffer.

In some examples, a virtual switch 910 supported by host 902 may monitor properties of the transmitted packet header to determine if those properties are to be used to cause an update to a mapping table 956 or add a mapping in mapping table 956. According to some examples, to program a mapping table, a source IP address of a packet may be transmitted from VM 904-1. For these examples, a mapping is created in mapping table 956 between that source IP address and VM queue 906-1 is assigned for that mapping. A packet received by NIC 950 with a destination IP address equal to the value of the source IP address of VM 904-1 is placed in mapped VM queue 906-1. Also, for these examples, the source IP address is used to program the mapping, but it is the destination IP address that is an inspected characteristic or property of packets received on the network card, to determine where to route these packets. Thereafter, a received packet having a property or properties that match the mapping rule is transferred from network interface 950 to VM queue 906-1 using DMA engine 952. For example, if VM 904-1 requests packet transmission from a source IP address of 2.2.2.2, and if no mapping rule for VM 904-1 is in mapping table 956, then virtual switch 910 may add a mapping of a received packet with a destination IP address of 2.2.2.2 to VM queue 906-1, which is associated with VM 904-1.

Virtual switch 910 may be any software and/or hardware device that provides one or more of: visibility into inter-VM communication; support for Link Aggregation Control Protocol (LACP) to control the bundling of several physical ports together to form a single logical channel; support for standard 802.1Q VLAN model with trunking; multicast snooping; IETF Auto-Attach SPBM and rudimentary required LLDP support; BFD and 802.1ag link monitoring; STP (IEEE 802.1D-1998) and RSTP (IEEE 802.1D-2004); fine-grained QoS control; support for HFSC qdisc; per VM interface traffic policing; network interface bonding with source-MAC load balancing, active backup, and L4 hashing; OpenFlow protocol support (including many extensions for virtualization), IPv6 support; support for multiple tunneling protocols (GRE, VXLAN, STT, and Geneve, with IPsec support); support for remote configuration protocol with C and Python bindings; support for kernel and user-space forwarding engine options; multi-table forwarding pipeline with flow-caching engine; and forwarding layer abstraction to ease porting to new software and hardware platforms. A non-limiting example of virtual switch 910 is Open vSwitch (OVS), described at https://www.openvswitch.org/.

An NFV orchestrator, VIM, cloud operating system, or hypervisor (not shown) may be used to program virtual switch 910. For example, OpenStack, described at https://www.openstack.org/ can be used as a cloud operating system. The NFV orchestrator, VIM, cloud operating system, or hypervisor can be executed on or supported by host 902 or may be executed on or supported by a different physical computing platform.

According to some examples, for a received packet, NIC 950 may use packet mapper 954 to route received packets and/or associated descriptors to a VM queue supported by host 902. Descriptor queues 958 may be used to store descriptors of received packets. Packet mapper 954 may use mapping table 956 to determine which characteristics of a received packet to use to map to a VM queue. A VM queue can be a region of memory maintained by host 902 that is able to be accessed by a VM. Content maintained or stored in the VM queue may be accessed in first-received-first-retrieved manner or according to any order that a VM requests. For example, a source IP address of 2.2.2.2 specified in a header of a received packet can be associated with VM queue 906-1 in mapping table 956. Based on mapping in mapping table 956, NIC 950 may use DMA engine 952 to copy a packet header, packet payload, and/or descriptor directly to VM queue 906-1, instead of copying the packet to an intermediate queue or buffer.

In some examples, as shown in FIG. 9, NIC 950 may also include a transceiver 960, processor(s) 966, a transmit queue 968, a receive queue 970, a memory 972, and a bus interface 974. Transceiver 960 may be capable of receiving and transmitting packets in conformance with applicable protocols such as Ethernet as described in IEEE 802.3, although other protocols may be used. Transceiver 960 may receive and transmit packets from and to a network via a network medium or link. Transceiver 960 may include PHY circuitry 962 and MAC circuitry 964. PHY circuitry 962 may include encoding and decoding circuitry (not shown) to encode and decode data packets. MAC circuitry 964 can be configured to assemble data to be transmitted into packets, that include destination and source addresses along with network control information and error detection hash values. Processor(s) 966 can be any processor, core, graphics processing unit (GPU), or other programmable hardware device that facilitates programming of NIC 950. For example, processor(s) 966 may execute packet mapper 954. Memory 972 may be any type of volatile or non-volatile memory device and may at least temporarily store instructions used to program one or more elements of NIC 950. Transmit queue 968 may include data or references to data for transmission by NIC 950. Receive queue 970 may include data or references to data that was received by NIC 950. Descriptor queues 958 may reference data or packets in transmit queue 968 or receive queue 970. In some examples, descriptor queues 958 that include transmit and receive queues 968 and 970 may be maintained in system memory for host 902 rather than at NIC 950. A bus interface 974 may provide an interface with host 902. For example, bus interface 974 can be compatible with PCI, PCI Express, PCI-x, Serial ATA, and/or USB compatible interface (although other interconnection standards may be used).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/ or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The following examples pertain to additional examples of technologies disclosed herein Example 1. An example network interface card (NIC) may include circuitry. The circuitry may access a memory arranged to maintain data to indicate expected CP traffic over a time period to provide an application service to one or more UEs wirelessly coupled to a communication network monitor CP traffic between the one or more UEs and a first VNF arranged to process the CP traffic for the application service provided to the one or more UEs through a second VNF arranged to process UP traffic for the application service, the UP traffic and the CP traffic routed through the NIC. The circuitry may also compare, following a monitoring time window over a first time period of the time period, monitored CP traffic to the expected CP traffic for the application service during the first time period. The circuitry may also cause at least a first portion of the UP traffic to be routed to a third VNF arranged to process UP traffic based on the comparison of the monitored CP traffic to the expected CP traffic.

Example 2. The NIC of example 1, the circuitry may cause at least the first portion of the UP traffic to be routed to the third VNF based on a determination that the monitored CP traffic exceeds a threshold value of the expected CP traffic during the monitoring time window.

Example 3. The NIC of example 2, the threshold value may be monitored CP traffic that is 75% greater than the expected CP traffic during the monitoring time window.

Example 4. The NIC of example 1, the expected CP traffic may be based on heuristic information to provide the application service that indicates expected CP traffic compared to UP traffic during the first time period.

Example 5. The NIC of example 1 may also include the second VNF and the third VNF supported by compute resources located in a first geographic location. The NIC of example 1 may also include the first VNF supported by compute resources located in a second geographic location that is different than the first geographic location.

Example 6. The NIC of example 1 may also include the third VNF supported by compute resources located in a first geographic location. The NIC of example 1 may also include the first VNF and the second VNF supported by compute resources located in a second geographic location that is different than the first geographic location.

Example 7. The NIC of example 6, the circuitry may also cause at least the first portion of the UP traffic to be routed to the third VNF also based on the one or more UEs being physically located closer to the first geographic location compared to the second geographic location.

Example 8. The NIC of example 1 may also include the first VNF being arranged to support RAN processing that includes processing control information related to providing the application service to the one or more UEs. The NIC of example 1 may also include the second VNF and the third VNF are arranged to support RAN processing that includes forwarding UP data between the one or more UEs and a source of at least a portion of the UP data.

Example 9. The NIC of example 1, the application service may be a communication service, a gaming service, a storage service, a computing service, a video streaming service or a gaming service.

Example 10. An example method implemented at a NIC may include monitoring CP traffic between one or more UEs wirelessly coupled to a communication network and a first VNF arranged to process the CP traffic for an application service provided to the one or more UEs through a second VNF arranged to process UP traffic for the application service. The UP traffic and the CP traffic may be routed through the NIC. The method may also include comparing, following a monitoring time window over a first time period of a time period, monitored CP traffic to expected CP traffic for the application service during the first time period. The method may also include causing at least a first portion of the UP traffic to be routed to a third VNF arranged to process UP traffic based on the comparison of the monitored CP traffic to the expected CP traffic.

Example 11. The method of example 10 may include causing at least the first portion of the UP traffic to be routed to the third VNF based on determining that the monitored CP traffic exceeds a threshold value of the expected CP traffic during the monitoring time window.

Example 12. The method of example 11, the threshold value may include monitored CP traffic that is 75% greater than the expected CP traffic during the monitoring time window.

Example 13. The method of example 10, the expected CP traffic may be based on heuristic information for providing the application service that indicates expected CP traffic compared to UP traffic during the first time period.

Example 14. The method of example 10 may also include the second VNF and the third VNF supported by compute resources located in a first geographic location. The method may also include the first VNF supported by compute resources located in a second geographic location that is different than the first geographic location.

Example 15. The method of example 10 may also include the third VNF supported by compute resources located in a first geographic location. The method may also include the first VNF and the second VNF supported by compute resources located in a second geographic location that is different than the first geographic location.

Example 16. The method of example 15 may also include causing at least the first portion of the UP traffic to be routed to the third VNF also based on the one or more UEs being physically located closer to the first geographic location compared to the second geographic location.

Example 17. The method of example 10 may also include the first VNF is arranged to support RAN processing that includes processing control information related to providing the application service to the one or more UEs. The method may also include the second VNF and the third VNF are arranged to support RAN processing that includes forwarding UP data between the one or more UEs and a source of at least a portion of the UP data.

Example 18. The method of example 10, the application service may be a communication service, a gaming service, a storage service, a computing service, a video streaming service or a gaming service.

Example 19. An example at least one machine readable medium may include a plurality of instructions that in response to being executed by a system may cause the system to carry out a method according to any one of examples 10 to 18.

Example 20. An example apparatus may include means for performing the methods of any one of examples 10 to 18.

Example 21. An example at least one machine readable medium may include a plurality of instructions that in response to being executed by a system at a NIC may cause the system to monitor CP traffic between one or more UEs wirelessly coupled to a communication network and a first VNF arranged to process the CP traffic for an application service provided to the one or more UEs through a second VNF arranged to process UP traffic for the application service. The UP traffic and the CP traffic may be routed through the NIC. The instructions may also cause the system to compare, following a monitoring time window over a first time period of a time period, monitored CP traffic to expected CP traffic for the application service during the first time period. The instructions may also cause the system to cause at least a first portion of the UP traffic to be routed to a third VNF arranged to process UP traffic based on the comparison of the monitored CP traffic to the expected CP traffic.

Example 22. The at least one machine readable medium of example 21, the instructions to cause the system to cause at least the first portion of the UP traffic to be routed to the third VNF may be based on a determination that the monitored CP traffic exceeds a threshold value of the expected CP traffic during the monitoring time window.

Example 23. The at least one machine readable medium of example 22, the threshold value may be monitored CP traffic that is 75% greater than the expected CP traffic during the monitoring time window.

Example 24. The at least one machine readable medium of example 22, the expected CP traffic may be based on heuristic information for providing the application service that indicates expected CP traffic compared to UP traffic during the first time period.

Example 25. The at least one machine readable medium of example 22 may also include the second VNF and the third VNF supported by compute resources located in a first geographic location and the first VNF supported by compute resources located in a second geographic location that is different than the first geographic location.

Example 26. The at least one machine readable medium of example 22 may also include the third VNF supported by compute resources located in a first geographic location and the first VNF and the second VNF supported by compute resources located in a second geographic location that is different than the first geographic location.

Example 27. The at least one machine readable medium of example 26, the instructions may further cause the system to cause at least the first portion of the UP traffic to be routed to the third VNF also based on the one or more UEs being physically located closer to the first geographic location compared to the second geographic location.

Example 28. The at least one machine readable medium of example 22 may also include the first VNF being arranged to support RAN processing that includes processing control information related to providing the application service to the one or more UEs. The at least one machine readable medium of example 22 may also include the second VNF and the third VNF being arranged to support RAN processing that includes forwarding UP data between the one or more UEs and a source of at least a portion of the UP data.

Example 29. The at least one machine readable medium of example 22, the application service may be a communication service, a gaming service, a storage service, a computing service, a video streaming service or a gaming service.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network interface card (NIC) comprising:
memory; and
circuitry to:
access the memory to retrieve data that indicates expected control plane (CP) traffic over a time period to provide an application service to one or more user equipment (UEs) wirelessly coupled to a communication network;
monitor CP traffic between the one or more UEs and a first virtual network function (VNF) arranged to process the CP traffic for the application service provided to the one or more UEs through a second VNF arranged to process user plane (UP) traffic for the application service, the UP traffic and the CP traffic routed through the NIC, the first VNF and the second VNF supported by compute resources located in a first geographic location;
compare, following a monitoring time window over a first time period of the time period, monitored CP traffic to the expected CP traffic for the application service during the first time period; and
cause at least a first portion of the UP traffic to be routed to a third VNF arranged to process UP traffic, the third VNF supported by compute resources located in a second geographic location, wherein the at least first portion of UP traffic is routed to the third VNF based on the comparison of the monitored CP traffic to the expected CP traffic and based on the one or more UEs being physically located closer to the second geographic location compared to the first geographic location.

2. The NIC of claim 1, comprising the circuitry to cause at least the first portion of the UP traffic to be routed to the third VNF based on a determination that the monitored CP traffic exceeds a threshold value of the expected CP traffic during the monitoring time window.

3. The NIC of claim 2, the threshold value comprises monitored CP traffic that is 75% greater than the expected CP traffic during the monitoring time window.

4. The NIC of claim 1, comprising the expected CP traffic is based on heuristic information associated with providing the application service, the heuristic information to indicate expected CP traffic compared to UP traffic during the first time period.

5. The NIC of claim 1, further comprising:
the first VNF is arranged to support radio access network (RAN) processing that includes processing control information related to providing the application service to the one or more UEs; and
the second VNF and the third VNF are arranged to support RAN processing that includes forwarding UP data between the one or more UEs and a source of at least a portion of the UP data.

6. The NIC of claim 1, the application service comprising a communication service, a gaming service, a storage service, a computing service, or a video streaming service.

7. A method implemented at a network interface card (NIC) comprising:
accessing a memory to retrieve data that indicates expected control plane (CP) traffic over a time period to provide an application service to one or more user equipment (UEs) wirelessly coupled to a communication network;
monitoring CP traffic between the one or more UEs and a first virtual network function (VNF) arranged to process the CP traffic for an application service provided to the one or more UEs through a second VNF arranged to process user plane (UP) traffic for the application service, the UP traffic and the CP traffic routed through the NIC, the first VNF and the second VNF supported by compute resources located in a first geographic location;
comparing, following a monitoring time window over a first time period of a time period, monitored CP traffic to expected CP traffic for the application service during the first time period; and
causing at least a first portion of the UP traffic to be routed to a third VNF arranged to process UP traffic, the third VNF supported by compute resources located in a second geographic location, wherein the at least first portion of UP traffic is routed to the third VNF based on the comparison of the monitored CP traffic to the expected CP traffic and based on the one or more UEs being physically located closer to the second geographic location compared to the first geographic location.

8. The method of claim 7, causing at least the first portion of the UP traffic to be routed to the third VNF based on determining that the monitored CP traffic exceeds a threshold value of the expected CP traffic during the monitoring time window.

9. The method of claim 8, the threshold value comprises monitored CP traffic that is 75% greater than the expected CP traffic during the monitoring time window.

10. The method of claim 7, comprising the expected CP traffic based on heuristic information associated with providing the application service the heuristic information to indicate expected CP traffic compared to UP traffic during the first time period.

11. The method of claim 7, further comprising:
the first VNF is arranged to support radio access network (RAN) processing that includes processing control information related to providing the application service to the one or more UEs; and
the second VNF and the third VNF are arranged to support RAN processing that includes forwarding UP data between the one or more UEs and a source of at least a portion of the UP data.

12. The method of claim 7, the application service comprising a communication service, a gaming service, a storage service, a computing service, or a video streaming service.

13. At least one non-transitory machine readable medium comprising a plurality of instructions that in response to being executed by a system at a network interface card (NIC) cause the system to:
monitor control plane (CP) traffic between one or more user equipment (UEs) wirelessly coupled to a communication network and a first virtual network function (VNF) arranged to process the CP traffic for an application service provided to the one or more UEs through a second VNF arranged to process user plane (UP) traffic for the application service, the UP traffic and the CP traffic routed through the NIC, the first VNF and the second VNF supported by compute resources located in a first geographic location;
compare, following a monitoring time window over a first time period of a time period, monitored CP traffic to expected CP traffic for the application service during the first time period; and
cause at least a first portion of the UP traffic to be routed to a third VNF arranged to process UP traffic, the third VNF supported by compute resources located in a second geographic location, wherein the at least first portion of UP traffic is routed to the third VNF based on the comparison of the monitored CP traffic to the expected CP traffic and based on the one or more UEs being physically located closer to the second geographic location compared to the first geographic location.

14. The at least one non-transitory machine readable medium of claim 13, the instructions to cause the system to cause at least the first portion of the UP traffic to be routed to the third VNF based on a determination that the monitored CP traffic exceeds a threshold value of the expected CP traffic during the monitoring time window.

15. The at least one non-transitory machine readable medium of claim 14, the threshold value comprises monitored CP traffic that is 75% greater than the expected CP traffic during the monitoring time window.

16. The at least one non-transitory machine readable medium of claim 13, comprising the expected CP traffic based on heuristic information associated with providing the application service, the heuristic information to indicate expected CP traffic compared to UP traffic during the first time period.

17. The at least one non-transitory machine readable medium of claim 13, further comprising:
the first VNF is arranged to support radio access network (RAN) processing that includes processing control information related to providing the application service to the one or more UEs; and
the second VNF and the third VNF are arranged to support RAN processing that includes forwarding UP data between the one or more UEs and a source of at least a portion of the UP data.

18. The at least one non-transitory machine readable medium of claim 13, the application service comprising a communication service, a gaming service, a storage service, a computing service, or a video streaming service.

* * * * *